United States Patent [19]
Bolick et al.

[11] 4,389,890
[45] Jun. 28, 1983

[54] PRESSURE REGULATOR ASSEMBLY GUARD

[76] Inventors: Stephen M. Bolick, 2417 Windbreak Dr., Alexandria, Va. 22306; John O. Vought, 9256 Sprucewood Rd., Burke, Va. 22015

[21] Appl. No.: 257,451

[22] Filed: Apr. 24, 1981

[51] Int. Cl.³ .......................................... G01D 11/24
[52] U.S. Cl. ...................................... 73/431; 137/382
[58] Field of Search .................. 73/431, 756; 137/382; 169/75; 220/85 P

[56] References Cited

U.S. PATENT DOCUMENTS

| | | | |
|---|---|---|---|
| 2,946,223 | 7/1960 | Lauer, Jr. | 73/431 |
| 4,088,194 | 5/1978 | Hard | 73/431 |
| 4,109,692 | 8/1978 | Brown | 220/85 P |
| 4,215,581 | 8/1980 | Bolick et al. | 73/431 |

FOREIGN PATENT DOCUMENTS 1294860 4/1962 France ............................... 220/85 P Primary Examiner—Donald O. Woodiel
Attorney, Agent, or Firm—Henderson & Sturm

[57] ABSTRACT

This invention relates to protective frameworks in general and more specifically to a protective guard member which is adapted to be secured to the throat of a compressed gas cylinder, and which compresses the associated regulator valves and gauges to prevent damage to the components and connections, should be the cylinder be tipped or knocked over.

5 Claims, 2 Drawing Figures

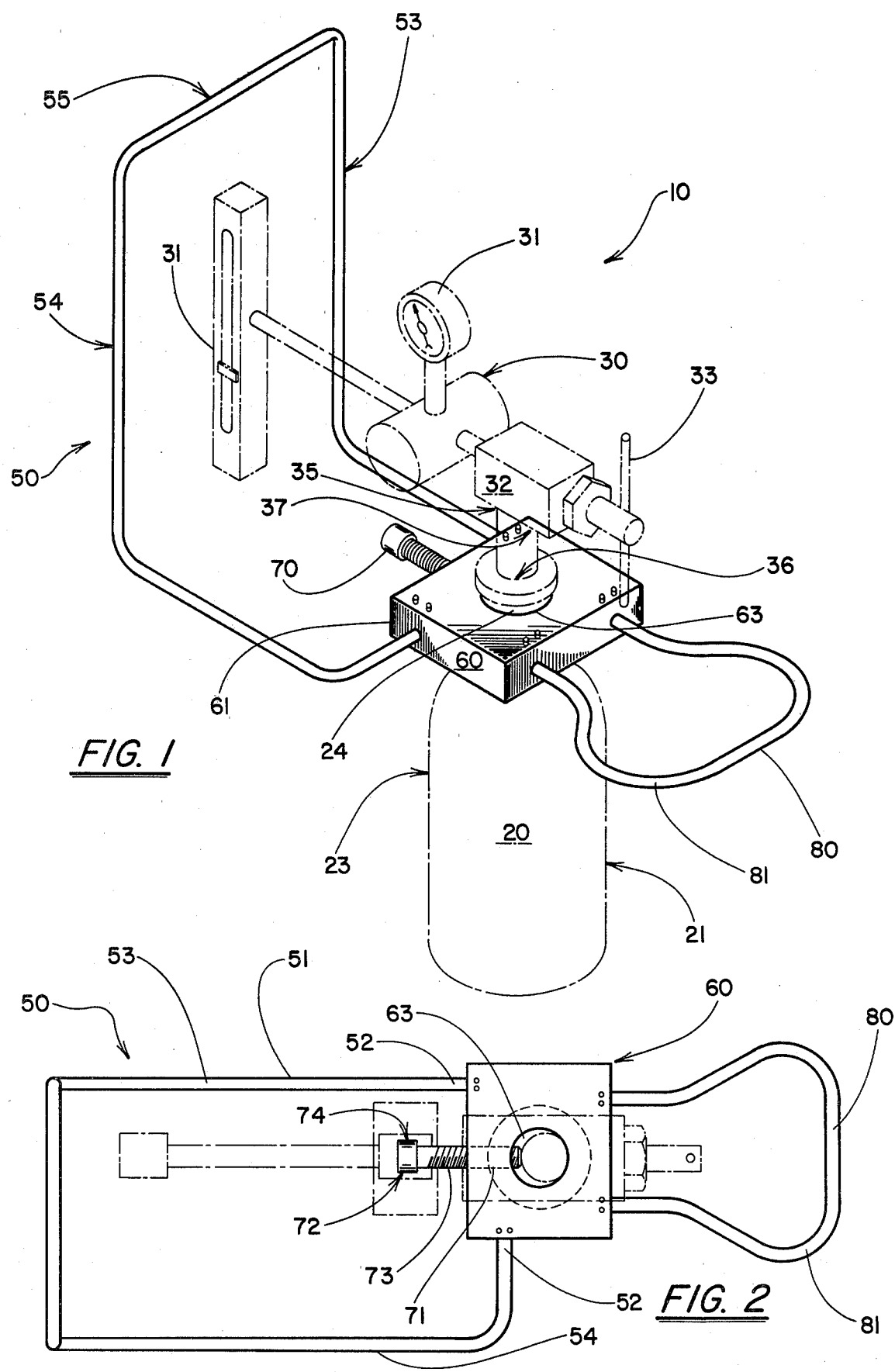

PRESSURE REGULATOR ASSEMBLY GUARD

BACKGROUND OF THE INVENTION

This application is an improvement over Ser. No. 74,853 filed Sept. 13, 1979, now U.S. Pat. No. 4,215,581.

Cylinders of compressed gas are routinely employed in various commercial, industrial and medical environments. Most cylinders have an elongated configuration which makes them inherently unstable when placed in an upright position. This instability creates numerous problems for the person using the apparatus, since very little force is necessary to tip the cylinder over.

Using a medical environment as an example, it should be appreciated that a respiratory therapist must continuously make minor adjustments to the pressure regulators which are attached to, and control the flow of oxygen from the cylinders to insure the proper oxygen levels are being supplied to the patient. The therapist must have an unobstructed view of the pressure gauge dials, and unrestricted access to the regulator valves, to make the necessary adjustments. All too often, when the therapist manipulates the valves, a force is imparted to the cylinder, which is sufficient to tip it over and send it crashing to the floor. They are also smashed on corners of hallway walls, elevator doors, doorways of patients rooms, and are generally mishandled and dropped.

Throughout the day there are many patients receiving oxygen that must be transported by respiratory therapists, orderlies and nursing personnel from their rooms to the x-ray department, physical therapy, recovery rooms after surgery, and from the special care area to the private or semi-private rooms after they are off the critical list. This accounts for heavy use and abuse of regulators.

While the cylinder is ruggedly constructed and virtually impervious to damage from such a fall, the regulator valves, gauges and associated connections are vulnerable to damage by virtue of their extended position relative to the cylinder. This is particularly so, since the weight of the associated hardware is normally cantilivered from the throat to the cylinder, tending to unbalance the cylinder in that general direction.

When a cylinder is knocked over, the weight of the entire assembly is therefore transmitted directly to the neck portion of the connecting hardware, which is inserted into the thorat of the cylinder. Since the gauges and regulators are very sensitive instruments, it is a very rare instance when the impact of the falling cylinder does not result in damage to these components. A more serious situation commonly arises when the weight of the falling cylinder is transmitted directly to the neck portion of the connecting hardware, and fractures it. Not only is the above described situation annoying and costly to the hospital, but the interruption of oxygen to the patient is obviously not beneficial, and may produce dire consequences for the individual involved.

This problem is not unique to the medical profession and there has been several prior art devices in other fields which have attempted to provide a solution, examples of which can be found in U.S. Pat. Nos. 3,985,716; 2,946,223; 3,293,917 and 3,320,811.

While these devices will provide some degree of protection for one or more of the components subject to damage, they do not adequately protect the entire assembly, nor do they provide unobstructed viewing of, or access to, the components, and they are particularly deficient in protecting the neck portion of the connecting hardware. They also permit the weight of the cylinder to be transmitted to the neck portion of the connecting hardware creating an extremely dangerous condition, with the cylinder becoming a propelled missile capable of massive destruction.

SUMMARY OF THE INVENTION

An object of the present invention is the provision of a rugged, lightweight regulator gauge guard which is adapted to fit most standard compressed gas cylinders.

Another object is to provide a guard framework which surrounds the connecting hardware attached to the cylinder, allowing the unobstructed viewing of, and access to, the gauges and regulator valves.

A further object of the invention is the provision of a guard member which prevents the fracturing of the neck portion of the connecting hardware, by insuring that the forces transmitted by the falling cylinder are transmitted directly to the relatively thick throat of the cylinder itself.

A still further object is the provision of a unique attaching mechanism which forms a protective collar around a portion of the cylinder throat in its assembled relationship.

An additional object of the present invention is the provision of a securing mechanism for the guard framework, which utilizes a locking screw dimensioned to receive the cylinder key, used to turn the cylinder on and off, and which can also be used to turn the locking screw into, and out of, engagement with the cylinder.

These and other objects, advantages and novel features of the present invention will become apparent from the following detailed description of the invention when considered in conjunction with the accompanying drawings.

BRIEF DESCRIPTION OF THE DRAWINGS

FIG. 1, is a perspective view of the regulator assembly guard as it would be affixed to a standard compressed gas cylinder.

FIG. 2, is a top plan view showing how the guard framework surrounds the regulator assembly.

DESCRIPTION OF THE PREFERRED EMBODIMENTS

As can be seen by reference to FIG. 1, the overall assembly is designated generally as 10, and comprises a compressed gas cylinder 20, a regulator assembly 30 and a guard member 50.

The cylinder 20 comprises an elongated cylindrical body 21, having a relatively flat base at one end, and a tapered shoulder portion 23, which terminates in a centrally disposed cylindrical throat member 24 at the other end. The throat member 24 is provided with a threaded opening containing a normally closed valve member (not shown) which cooperates with the regulator assembly 30 in a well known manner, to open and regulate a fluid passage from the interior of the cylinder to an end user, such as a patient undergoing respiratory therapy. The regulator assembly 30 is a standard item, comprising one or more pressure indicating gauges 31, which reflect the levels of pressure being drawn from the cylinder through the pressure regulator valves 32, in response to the position of the control knobs 33. The operator, which in the preferred embodiment is presumed to be a respiratory therapist, constantly monitors the guages 31 and manipulates the control knobs 33 to maintain the oxygen levels flowing through the assembly. The fluid path from the cylinder 20 to the patient is through a plurality of fluid couplings 34 which are connected to a "T" or inverted "L" shaped neck portion 35 which forms the inlet coupling 36 to the cylinder.

The exterior of the inlet coupling 36 threadedly engages the interior of the cylindrical throat member 24 of the cylinder or oxygen tank 20.

The cylinder walls are very thick, and designed to withstand tremendous impact forces, to prevent the sudden release of their pressurized contents. The gauges are by their very nature delicate instruments subject to damage by minor impact forces, the regulator valves and fluid couplings are vulnerable to moderate impact forces, and neck portion 35 of the inlet coupling 36 has repeatedly experienced structural failure in the form of total fracture (in the area 37) when the initial point of impace of the falling cylinder is on the outboard end of the fluid coupling.

To prevent damage to the regulator assembly 30, a guard member 50 has been developed which attaches directly to the throat 24 or body 21 of the cylinder 20, so that all impact forces are transmitted directly to the cylinder. The guard 50 comprises a rigid framework 51 formed from a steel rod having end portions 52, which are rigidly fastened to a securing means 60. The framework 51 is generally U-shaped in configuration with a bend of approximately 90° in the vicinity of its midpoint. The framework 51 is attached to the cylinder 20 via the securing means 60 which will be discussed in greater detail further on.

As can be seen by reference to FIGS. 1 and 2, the guard 50 extends below, beyond and above the regulator assembly 30 which it encompasses. The drawing illustrate that the legs 53, and 54 which comprise the framework 51 are parallel over a major portion of their combined running length. In fact the only point where the legs 53 and 53 are not parallel is in the vicinity of the securing means 60. As can best be seen by reference to FIG. 2, leg 53 extends directly away from the securing mechanism 60 in one horizontal direction, and leg 54 extends directly away from the securing means in another horizontal direction approximately 90° apart. After leg 54 has projected a short distance from said securing means 60 it is bent in the horizontal plane into a parallel relationship with leg 53. Both of the legs then continue in parallel relationship in the horizontal plane, a distance beyond the outboard end of the regulator 30. At this point the framework 53 projects vertically upward, and the legs 53 and 54 extend above the top of the regulator assembly 30, whereupon the legs 53 and 54 converge in the horizontal plane to form the base portion 55 of the inverted U-shape of the framework. Since the framework 51 is in the form of an inverted loop, the portion 55 of the guard can also serve as a carrying handle for the cylinder 20.

Obviously the specific dimensions of the framework can be customized for special uses and various sized regulator assemblies. The only criteria for the dimensions of the framework are to insure that the guard, is spaced from, and extends below, beyond and above the external dimensions of the regulator. As can be seen in FIG. 2, the legs 53 and 54 diverge in the vicinity of the securing means 60, so that the guard 50 extends beyond the regulator in both the horizontal and vertical planes.

The securing means 60, which is illustrated in FIGS. 1 and 2, comprises an apertured collar member 61, which is provided with a locking means 70, and a handle member 80. The apertured collar member 61 comprises a thick rigid plate 62 having an enlarged central aperture or opening 63, which can be dimensioned to receive, only the cylinder neck 24 (solid lines), or the entire cylinder body 21 (dashed lines). The handle member 80 is in the form of an elongated loop having an enlarged outboard end 81 which is dimensioned to receive a persons hand, and may be fabricated from the same material which forms the framework, or any other suitable material. In any event both the framework 51 and the handle member 80 are rigidly attached to the securing means 60 in the horizontal plane, and are intended to be an integral part of the improved guard 10. The rigid attachment of the respective elements may be accomplished by welding, adhesive bonding, locking pins, etc., so long as the end product is a unitary structure.

The locking means 70 comprises a threaded aperture 71 in the plate 62 disposed perpendicularly to the central aperature 63 and in open communication therewith. The threaded aperture 71, in the perferred embodiment, should be located within the horizontal plane proscribed by either the framework 51 or the handle member 80. As will be explained, this particular disposition of the threaded aperture 71, provides an additional safety feature, since it serves to protect the locking screw 72 which it is dimensioned to receive. The locking screw 72 has an elongated threaded shaft portion 73, and an enlarged head 74, which is dimensioned to be received by an instrument (not shown) commonly refered to as the "cylinder key", which is used to turn the cylinder on and off.

Since most cylinders are provided with "cylinder keys", it is a simple matter to install the guard 10 on any compressed gas cylinder. The installation would proceed as follows: the central aperture would be slipped over the appropriate portion of the cylinder, and one in the desired position, the locking screw 71 would be engaged manually or via the "cylinder key" to bring the end of the threaded shaft 73 into engagement with one side of the cylinder; thereby forcing the other side of the cylinder into engagement with a portion of the enlarged central aperture 63. The locking screw 72 therefore rigidly engages or secures the guard 10 to the cylinder 20, and this engagement will be maintained until it is desired to remove the guard, and the reverse procedure us followed.

It should be appreciated by not, that disposing the threaded aperture 71 and locking screw 72 within the horizontal plane proscribed by the framework or the handle, virtually eliminates any possibility that the locking screw would be subjected to any force, which would loosen its engagement with the cylinder, nor would it be subjected to a force which could concievably fracture the locking screw within the threaded aperture, making it virtually impossible to remove the guard from the cylinder.

It can thus be seen that a protective guard constructed in accordance with the teachings disclosed herein, will result in a structure which will transmit all impact forces directly to the cylinder, provided unobstructed, viewing of, and access to, the regulator assembly, protect the locking means, as well as satisfying all of objects stated supra.

Having thereby disclosed the subject matter of this invention it should be obvious that many modifications, substitutions and varifications of the invention are possible in light of the above teachings. It is therefore to be understood that the invention may be practiced other than as specifically described, and should be limited only by the breadth and scope of the appended claims.

What we claim is:

1. A guage guard for use with a pressure regulating assembly, including pressure regulating valves, regulator guages and a plurality of fluid couplings operatively connecting the regulator assembly to a source of pressurized gas; where the source of pressurized gas is an elongated cylinder, having a cylindrical throat member into which one of the plurality of fluid couplings is inserted, the guard comprising;
   an apertured collar comprising a plate having an enlarged centrally disposed aperture dimensioned to receive a portion of the cylinder, and having a handle member rigidly secured thereto;
   a rigid framework, secured to the apertured collar, which is spaced from, and projects below, beyond and above the regulator assembly, and is dimensioned to extend beyond the regulator assembly in the vertical and horizontal planes, and comprises a rod formed into the shape of a loop having two legs, which are disposed parallel to one another over a major portion of their combined length, and
   locking means for attaching the apertured collar and the framework to a portion of the cylinder.

2. A gauge guard as in claim 1, wherein, the apertured collar further comprises;
   a threaded aperture perpendicularly disposed with respect to said enlarged central aperture and in open communication therewith.

3. A gauge guard as in claim 2, wherein, the locking means comprises;
   a locking screw having an enlarged head, and an elongated threaded shaft which is dimensioned to be received within said threaded aperture.

4. A gauge guard as in claim 3, wherein, said locking screw is disposed within the horizontal plane proscribed by said rigid framework.

5. A gauge guard as in claim 3, wherein, said locking screw is disposed within the horizontal plane proscribed by said handle member.

* * * * *